Patented Oct. 26, 1937

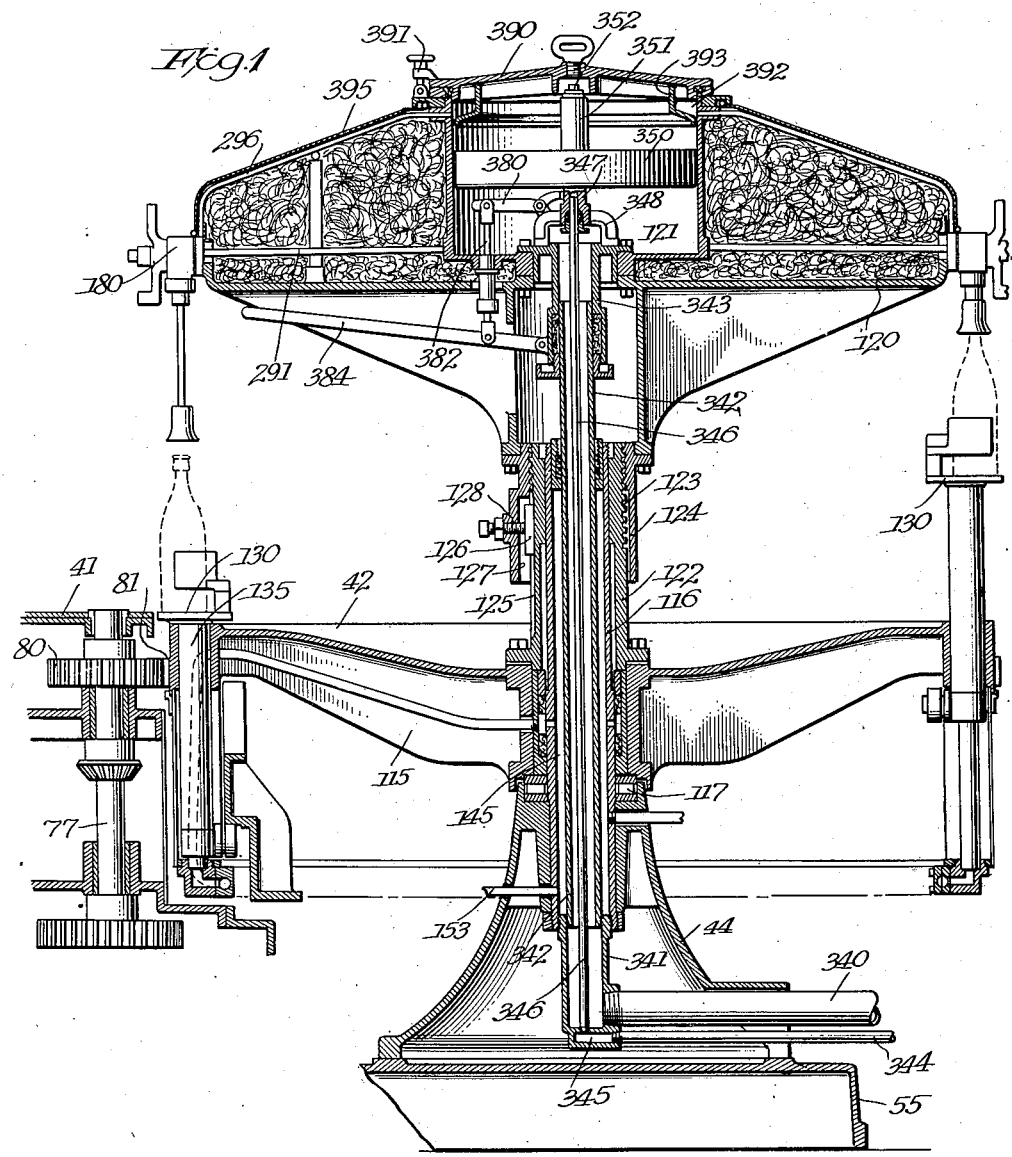

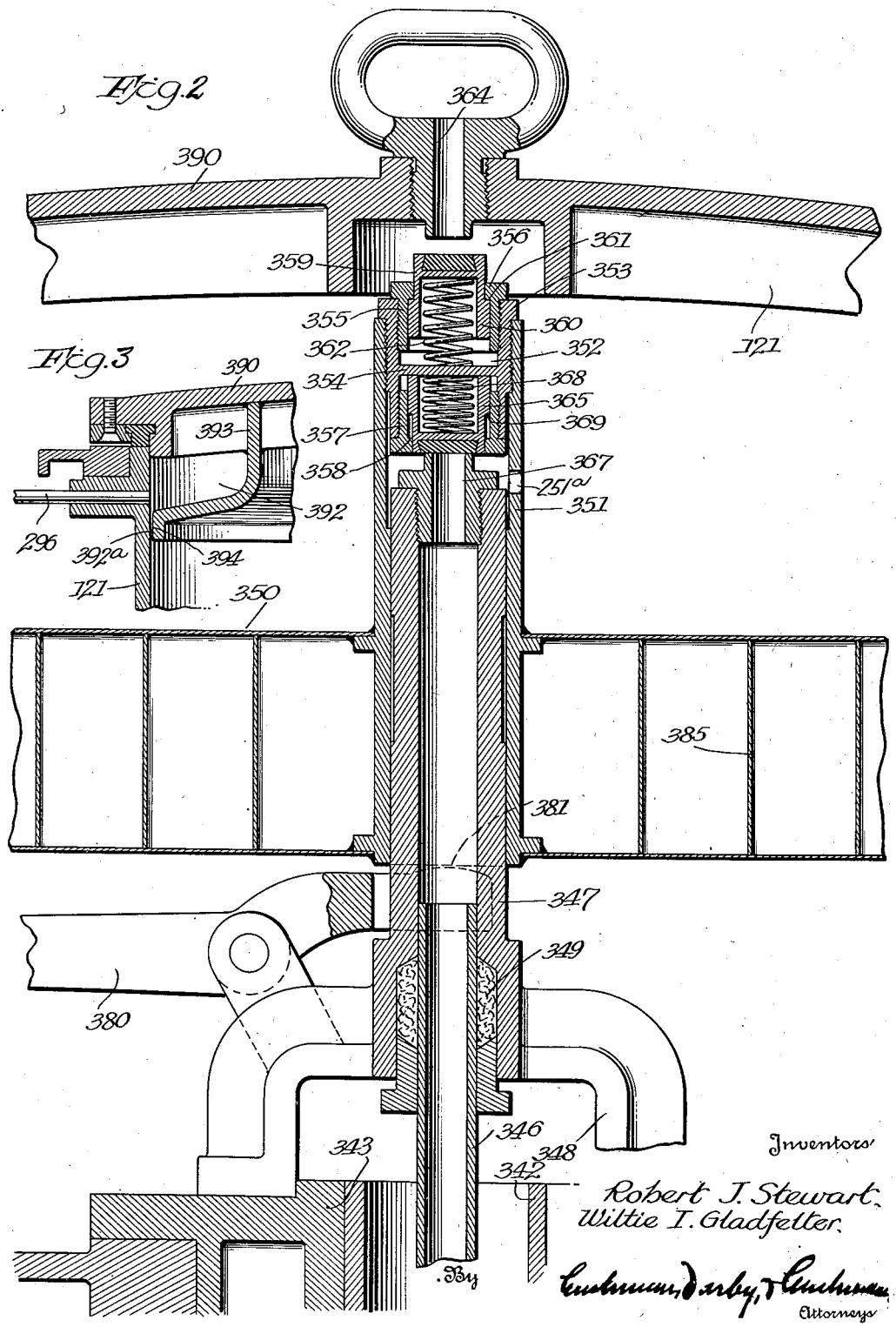

2,097,107

UNITED STATES PATENT OFFICE 2,097,107

FILLING MACHINE

Robert J. Stewart and Willie I. Gladfelter, Baltimore, Md., assignors to Crown Cork & Seal Company, Inc., Baltimore, Md., a corporation of New York Application August 14, 1934, Serial No. 739,818

28 Claims. (Cl. 226—118)

The present invention relates to filling machines and, more particularly, to a machine for bottling beer.

The principal object of the invention is to provide an apparatus which will operate at a high rate of speed to bottle beer and with a minimum possibility of the beer foaming or coming into contact with air during the filling operation.

In bottling beer, it is highly important that the beer be kept out of contact with the air and also that the beer be quietly flowed into the bottles to prevent foaming. In beer filling machines, the beer is ordinarily drawn from the Government vat to a central reservoir or filling tank provided upon the machine. A slight pressure of air is maintained above the beer in the reservoir, the surface of the body of beer ordinarily being in contact with this air. The exposure of the beer to the air permits the gas present in the beer to escape into the air, with the result that the strength and flavor of the beer is affected.

An important object of the present invention is to provide a reservoir which is so constructed that the beer therein will be substantially isolated from the air. This result is obtained by the use of a float which entirely covers the surface of the beer and substantially contacts with the inner wall of the reservoir. The float used in the present machine is of such construction that no air or foam can accumulate beneath the float.

Beer filling machines have heretofore been provided with floats which substantially cover the surface of the beer, but these prior art floats have been of bell construction, that is, the float has included an upper wall and depending side walls but no bottom wall. In a float of this type, during periods when the reservoir contains no beer, air may enter the underside of the bell-shaped float and when beer is subsequently flowed into the reservoir, air will be locked within the bell-shaped float, thereby exposing the beer to that body of air. Furthermore, foam may accumulate in the underside of a float of bell construction and it is extremely desirable that no foam be present at any point in the machine since it interferes with the efficient filling of the bottles.

At the start of a run of a beer filling machine, the beer which is placed in the first group of bottles passed through the machine is usually warm and will foam quite readily. The result is that the first bottles are filled only approximately one-half full with beer, foaming occurring to such an extent that the remainder of each bottle is filled with foam. Regardless of the number of times which such a bottle may be run through the machine, no more beer will flow into the bottle because of the foam present therein.

A further object of the invention is to provide a filling reservoir which is so constructed that foam will be prevented from flowing into the bottles being filled.

In the present machine, this result is obtained by having the counter-pressure air tubes leading from the reservoir baffled with respect to the remainder of the reservoir so that foam in the reservoir may not reach the mouths of these tubes and flow into the bottles.

Other objects and advantages of the invention will be apparent from the following drawings, wherein like numerals refer to similar parts throughout the views.

In the drawings:

Figure 1 is a vertical sectional view of a filling machine, a portion of the work table and also a number of the filling heads being omitted.

Figure 2 is a vertical sectional view of the central portion of the filling reservoir.

Figure 3 is a fragmentary vertical sectional view of the upper portion and top or cover of the filling reservoir.

The filling machine with which the invention is shown in the drawings includes a stationary table 41 and a rotating filling mechanism 42, both mounted on a base indicated at 55.

The bottles are fed from the stationary table 41 to the rotary filling mechanism 42 by well-known conveyor means and are positioned upon reciprocable bottle supporting platforms 130 spaced about the periphery of the filling table 115.

The base 55 includes a standard 44 upon which the filling mechanism 42 is journaled for rotation. A fixed tubular member 116 extends upwardly from the standard 44, the table 115 being supported upon bearings 117 provided at the upper end of the standard and surrounding the member 116 as shown in Figure 1.

The filling mechanism 42 is rotated from a shaft 77 journaled in the stationary table 41, shaft 77 being driven in the usual manner and being provided with a pinion 80 adjacent to its upper end which engages a ring gear 81 secured to the circumference of the filling table 115.

A table-like casting 120 is provided which, at its central portion, supports the filling reservoir 121 and has filling heads 180 secured to its periphery, being supported for vertical adjustment with respect to the table 115 of the filling mechanism by the structure now to be described. A tubular member 122 is fixed to the table 115, the member 122 being provided with external threads 123 at its upper end. A tubular member 124 fixed to and depending from the casting 120 is provided with internal threads engaging the threads 123. The lower tubular member 122 is provided with an external axially extending keyway 125 upon its outer surface which is adapted to be engaged by a key block 126 guided for radial movement in a recess 127 in the inner wall of the depending tubular member 124. The key block 126 has a threaded stud 128 projecting from its rear surface, the inner end of the stud being rotatably connected to the key block 126 and having its threaded portion engaging a threaded bore in the wall of the tubular member 124. The outer end of the stud 128 is headed so that it may be engaged by a wrench, and a lock nut may be provided upon the stud to hold it in proper position. When the key block 126 is withdrawn from the keyway 125, the casting 120 and the filling heads carried thereby may be turned upon the threaded sleeve 122 and with respect to the table 115 and the bottle supporting platforms carried by the latter to either raise or lower the filling heads. The provision of the key block and keyway will insure that the casting 120 may be repositioned in such a manner that the filling heads and bottle supporting platforms can be properly aligned after adjustment.

Referring to Figure 1 the filling tank or reservoir 121 is supplied with beer by a pipe 340 connected to the Government vat, not shown, the pipe 340 being connected to a fitting 341 secured to the lower end of the non-rotatable tube 116. Within the tube 116 a pipe 342 extends upwardly from the fitting 341, the upper end of the pipe 342 being surrounded by a flange 343 depending from about an opening into the lower wall of the reservoir 121. Packing is provided between the lower end of the flange 343 and the upper end of the pipe 342 in order that vertical movement of the reservoir and the casting 120 may be accomplished relative to the pipe 342.

Counter-pressure air is supplied to the machine from any suitable source of pressure through a line 344, the inner end of this pipe being connected to a chamber 345 in the lower end of the fitting 341. A pipe 346 connected to the chamber 345 extends upwardly within the beer pipe 342, the upper end of the air pipe 346 terminating within a tube 347 best shown in Figure 2 and which is fixed to the lower wall of the reservoir 121 by means of a spider 348. Packing 349 is provided between the lower portion of the tube 347 and the pipe 346 to seal the joint between the two and to permit the reservoir and tube 347 to be vertically adjusted with respect to pipe 346. A float 350 is slidably guided upon the tube 347 within the reservoir 121, the float being provided with a central sleeve 351 which fits upon the tube 347 and extends above the upper surface of the float. A valve mechanism 352 for controlling inflow and exhaust of air in the reservoir and thereby maintaining the beer at the proper level is carried by the upper end of the float-supported sleeve 351 so that the operation of the valve may be controlled in accordance with the position of the float.

As is shown in Figure 2, the valve mechanism 352 is supported in the upper end of the sleeve 351 upon a collar 353 threaded in the upper end of the sleeve, collar 353 being provided with a web 354 extending across the same intermediate its ends. A stop ring 355 is threaded within the upper end of the collar 353, ring 355 being provided with an inwardly extending flange 356 at the upper end thereof. A stop ring 357 provided with an inwardly extending flange 358 at its lower end is provided in the lower end of the webbed collar 353. An upper valve member 359 of inverted cup-shape is provided within the upper stop ring 355, the valve member being provided with an enlarged portion 360 about its lower end forming a shoulder 361 which will contact with the flange 356 of stop ring 355 to limit the upward movement of the valve member 359. The enlarged portion 360 of the valve member 359 has a close sliding fit with the inner surface of the stop ring 355 to properly guide the vertical movement of the valve member and a spring 362 having one end bearing against the upper surface of the web 354 is positioned within the cup-shaped valve member to tend to hold the valve member in the upward position shown in Figure 2. An insert of suitable material is fixed in the upper end of the valve member 359, this insert being adapted to bear against a valve seat provided about a vent port 364 provided in the upper wall of reservoir 121.

A downwardly facing lower valve member 365 of a form identical with the upper valve member 359, but inverted, is provided to control the inflow of counter-pressure air, valve member 365 including an insert in its lower end adapted to contact with a valve seat 367 provided at the extreme upper end of the tubular member 347. The valve member 365 is tended to downward position by a spring 368 positioned within it and bearing against the web 354, the downward movement of this valve member being limited by a shoulder 369 adapted to abut against the flange 358 of the lower stop ring 357. Air or gas flowing from valve seat 367 will move through an aperture 351a in the float sleeve 351 to the upper portion of the reservoir.

The valve mechanism 352 is so designed that the valve members 359 and 365, together, have a range of movement relative to the web 354 somewhat greater than the distance between the seat 367 of the tube 247 through which air flows into the reservoir and the seat at the inner end of the vent 364 of the reservoir. By this arrangement, it is possible for the valve springs to simultaneously hold the valve members in seated position to close both the inlet and vent ports or, alternatively, to close either the inlet or vent, but it will be impossible for both the inlet and the vent to be simultaneously opened.

As shown in Figure 2, an arm 380 is pivoted on spider 348, the inner end 381 of the arm being adapted to contact with the lower end of the sleeve 351 forming the center of the float 350. As shown in Figure 1, the outer end of the arm 380 is connected by a link 382 extending through a packed aperture in the lower wall of the reservoir to a point of connection with an operating lever 384, the inner end of this lever being pivoted to the depending collar 343 of the reservoir. The outer end of the lever 384 is positioned adjacent the periphery of the casting 120 so that it will be readily accessible to an operator.

The float 350 is hollow and, as shown in Figure 2, may be braced by preferably concentric bracing members 385 extending between the upper and lower end walls of the float. The diameter of the float is such that an extremely small clearance is provided between the peripheral wall of the float and the inner wall of the reservoir, the two being substantially in contact to prevent access of air to the beer beneath the float. Since the gas in the beer is heavier than the air above the float, it will be impossible for air to flow downwardly between the wall of the float and the wall of the tank. Therefore, by the above arrangement, the beer will be protected against contact with air throughout filling by the present machine.

The provision of the upwardly extending sleeve 351 moving on the tube 347 will guide the float in a truly rectilinear direction so that it cannot become angularly disposed in the reservoir and thereby be held against movement.

The reservoir 121 is provided with a top 390 which is secured in position thereon by pivoted bolts 391 (Figure 1). A packing ring may be provided about the lower edge of the cover plate to seal the reservoir to the atmosphere. A handle is provided at the central portion of the top 390 and suitable gauges may extend through the cover plate to indicate conditions within the reservoir.

It is desirable that some arrangement be provided to prevent any foam which may pass up and about the float 350 from flowing into the bottles from the filling heads 180 which are connected to the upper portion of reservoir 121 through the counter-pressure air pipes 296. This result may be obtained by providing within the reservoir a chamber 392 with which the counter-pressure pipes 296 communicate, this chamber having restricted communication with the body of the filling reservoir. Figure 3 shows a construction whereby such a chamber is provided. As is illustrated in this figure, the chamber 392 may be formed by a flange 393 depending from the top or cover plate 390 of the filling reservoir, the flange being joined to the underside of the top at a point spaced inwardly from the side wall of the reservoir. The body of the flange 393 is substantially right-angled in cross-section and, as shown, its free end 394 extends downwardly and substantially parallel with the inner surface of the side wall of the reservoir 121 to provide a narrow passage 392a affording restricted communication between the chamber 392 and the body of the reservoir 121. The flange 393 acts as a baffle providing restricted communication between the body of the reservoir and the chamber 392.

By the above arrangement, any foam which may pass upwardly between the periphery of the float 350 and the side wall of the reservoir will be prevented from reaching the counter-pressure air pipes 296 because, while the passage 392a provides sufficient clearance to permit air to flow between the chamber 392 and the body of the reservoir, it will prevent the passage of the foam into the chamber 392. The restricted clearance between the flange or baffle plate 393 and the wall of the reservoir results in a somewhat higher pressure of air in the chamber 392 than in the body of the reservoir and this further serves to prevent foam from entering the chamber 392.

At the moment that air is returning to the reservoir through one tube 296 from a bottle, air is simultaneously flowing outwardly to another bottle through another tube 296. The fact that the mouths of the counter-pressure air tubes are within a chamber which is substantially closed to the body of the reservoir tends to cause the air to flow directly from one tube and in the chamber 392 to another tube, thereby resulting in a circulation of air in the chamber 392 which further tends to prevent foam from entering that chamber. Air returned through the tubes 296 from the bottles also flows continuously from the chamber 392 to the body of the reservoir through the passage 392a and this downward flow through the passage definitely prevents foam from moving upwardly through the passage.

An inclined cover plate 395 extends from the upper portion of the reservoir to the edge of the casting 120 and, as shown in Figure 1, the space between this cover plate and the casting 120 is packed with insulating material so that the reservoir and the pipes 291 and 296 extending from the latter to the filling heads will be kept at a temperature to maintain the beer cool.

The manner of operation of the reservoir is as follows: When the machine is first set in operation for a run, the reservoir will of course be empty with the float 350 in its lowermost position as indicated in Figure 2. With the manual valve, not shown, in the beer pipe 340 closed, and with the manual valve, also not shown, in the counter-pressure air supply pipe 344 open, the float is lifted by downward movement of the lever 384. This action will raise the lower valve member 365 from its seat and will move the upper valve member 359 to close the vent 364. The float may be held in this position until the reservoir is filled with counter-pressure air at the proper pressure. The valve in the beer line 340 may then be opened so that beer may flow into the reservoir through the tube 342 and flanged opening 343, the lever 384 being gradually raised by the operator to permit the float 350 to descend to a point where it will rest upon the surface of the beer or to a position where both the counter-pressure air inlet 367 and the vent 364 will both be closed.

When the machine is in normal operation, as beer flows from the tank to the filling heads 180 through the pipes 291, the level of the beer in the reservoir will naturally be lowered, causing the float 350 to drop. When the float drops sufficiently to move the upper valve member 359 away from the air vent 364, the air pressure in the reservoir will be reduced and additional beer will flow into the latter. Because of the fact that the air originally in the empty bottles will be sealed therein when the bottles are moved against the filling heads, and will be moved to the reservoir with the counter-pressure air which moves back into the reservoir while beer is flowing into the bottles, the air supply in the reservoir will tend to build up while the quantity of beer will tend to gradually diminish. However, as has been stated above, the lowering of the float either by reason of the increased air pressure or the reduction of the quantity of beer will permit the air to be vented. Should a bottle be broken during the counter-pressure stage, counter-pressure air may escape to the atmosphere from the filling head. However, the counter-pressure stage is of such short duration that it will not be possible for the air supply in the reservoir to be seriously depleted. In any event, should the air pressure in the reservoir be lowered, the beer level will raise and float 350 will lift the lower valve member 365 from its valve seat 367, permitting additional air to flow into the reservoir.

It will be noted from the above that the flow of beer to the tank is entirely controlled by the air pressure maintained in the reservoir and that the air pressure and the beer level act to control each other.

The provision of the chamber 392 or, in other words, the baffling of the mouths of the counter-pressure tubes 296 by the flange 393 will prevent foam from reaching these tubes.

It will be understood that the invention is not limited to the details of construction shown in the drawings, and that the example of the use of the invention which has been given does not include all of the uses of which it is capable; and that the phraseology employed in the specification is for the purpose of description.

We claim:

1. The combination in a filling machine including a reservoir for liquid and counter-pressure fluid, of means to isolate the liquid from the counter-pressure fluid comprising a float of substantially the same area as the cross-sectional area of the reservoir, but having free vertical movement with respect to the reservoir wall, said float being provided with side walls of substantial depth to provide a relatively long and sealing area between the portions of the reservoir at each end thereof, and means within and secured to the reservoir to guide the movement of the float and to hold the side walls thereof in alignment with the inner walls of said reservoir.

2. The combination in a filling machine reservoir for liquid and gas, of an inlet for gas, an outlet for gas, valve means including a pair of oppositely facing valves for controlling said inlet and outlet, and means to operate said valve means in accordance with the height of liquid in the reservoir to close either said inlet or outlet or both.

3. The combination in a filling machine reservoir for liquid and gas, of an inlet for gas, an outlet for gas, valve means including a pair of oppositely facing valves for controlling said inlet and outlet, means to operate said valve means in accordance with the height of liquid in the reservoir to close either said inlet or outlet or both, and means to manually actuate said last-named means.

4. The combination in a filling machine reservoir for liquid and gas, of an inlet for gas, an outlet for gas, valve means including a pair of oppositely facing valves for controlling said inlet and outlet, and means to operate said valve means in accordance with the height of liquid in the reservoir to close both said inlet and outlet.

5. The combination in a filling machine reservoir for liquid and gas, of an inlet for gas, an outlet for gas, valve means including a pair of oppositely facing valves for controlling said inlet and outlet, means to operate said valve means in accordance with the height of liquid in the reservoir to close both said inlet and outlet, and means to manually actuate said last-named means.

6. The combination in a filling machine reservoir for liquid and counter-pressure fluid, of a float, an inlet for counter-pressure fluid, an outlet for counter-pressure fluid, and valve means carried by said float for controlling said inlet and outlet and arranged to be operated by the float to close either said inlet or outlet or both.

7. The combination in a filling machine reservoir for liquid and counter-pressure fluid, of a float, an inlet for counter-pressure fluid, an outlet for counter-pressure fluid, and valve means carried by said float for controlling said inlet and outlet and arranged to be operated by the float to normally close both said inlet and outlet.

8. The combination in a filling machine reservoir for liquid and counter-pressure fluid, of a float, an inlet for counter-pressure fluid, an outlet for counter-pressure fluid, and valve means carried by said float for controlling said inlet and outlet, both of said valves being arranged to be closed in normal position of said float and one of said valves being adapted to be opened upon movement of said float from normal position.

9. The combination in a filling machine reservoir for liquid and counter-pressure fluid, of a float, an inlet for counter-pressure fluid, an outlet for counter-pressure fluid, and a pair of valves carried by said float and relatively movable with respect to each other to close either said inlet or outlet or both.

10. The combination in a filling machine reservoir for liquid and counter-pressure fluid, of a float, an inlet for counter-pressure fluid, an outlet for counter-pressure fluid, a pair of oppositely facing valves adapted to respectively control flow through said inlet and said outlet, said valves being carried by said float and relatively movable with respect to each other, and means to limit the movement of said valves away from each other so that in predetermined positions of said float either said inlet or outlet may be opened.

11. The combination in a filling machine reservoir for liquid and counter-pressure fluid, of a float, an inlet for counter-pressure fluid, an outlet for counter-pressure fluid, a pair of oppositely facing valves adapted to respectively control flow through said inlet and said outlet, said valves being carried by said float and relatively movable with respect to each other, and means to limit the movement of said valves away from each other so that in predetermined positions of said float either said inlet or outlet may be open or both may be closed.

12. The combination in a filling machine reservoir for liquid and counter-pressure fluid, of a float, an inlet for counter-pressure fluid, an outlet for counter-pressure fluid, a pair of oppositely facing valves carried by said float, said valves being movable with respect to each other, and spring means to hold one of said valves against the port which it is adapted to control or to hold both valves against their respective ports, in accordance with the position of said float.

13. The combination in a filling machine reservoir for liquid and counter-pressure fluid, of a float, an inlet for counter-pressure fluid, an outlet for counter-pressure fluid, a pair of oppositely facing valves carried by said float, said valves being movable with respect to each other, and spring means to hold both valves against their respective ports in the normal position of said float.

14. The combination in a filling machine reservoir for liquid and counter-pressure fluid, of a float, an inlet for counter-pressure fluid, an outlet for counter-pressure fluid, a pair of oppositely facing valves carried by said float and respectively adapted to control said inlet and outlet, means to limit the movement of each valve with respect to said float and toward the port controlled thereby, and spring means to tend to hold said valves at the limit of their movement away from each other to close either said inlet or outlet or both in accordance with the position of said float.

15. The combination in a filling machine reservoir for liquid and counter-pressure fluid, of a float, an inlet tube for counter-pressure fluid extending upwardly into the reservoir, said float being slidable upon said tube, an outlet for counter-pressure fluid vertically aligned with said tube and spaced from the upper end of the latter, and a pair of oppositely facing valves adapted to respectively control flow through said tube and said outlet, said valves being carried by said float and being relatively movable with respect to each other to close either said inlet or outlet or both.

16. The combination in a filling machine reservoir for liquid and counter-pressure fluid, of a float, an inlet tube for counter-pressure fluid extending upwardly into the reservoir, said float being slidable upon said tube, an outlet for counter-pressure fluid vertically aligned with said tube and spaced from the upper end of the latter, and a pair of oppositely facing valves adapted to respectively control flow through said inlet and said outlet, said valves being carried by said float and relatively movable with respect to each other and said float, and means to limit the outward movement of said valves with respect to each other so that in predetermined positions of said float either said inlet or said outlet may be open.

17. The combination in a filling machine reservoir for liquid and counter-pressure fluid, of a float, an inlet tube for counter-pressure fluid extending upwardly into the reservoir, said float being slidable upon said tube, an outlet for counter-pressure fluid vertically aligned with said tube and spaced from the upper end of the latter, a pair of oppositely facing valves carried by said float and respectively adapted to control flow through said tube and said outlet, means to limit the movement of each valve with respect to said float and toward the port respectively controlled thereby, and spring means to tend to hold said valves at the limit of their movement away from each other to close either said inlet or outlet or both in accordance with the position of said float.

18. The combination in a filling machine reservoir for liquid and counter-pressure fluid, of a float, an inlet for counter-pressure fluid, an outlet for counter-pressure fluid, a pair of oppositely facing valves carried by said float and respectively adapted to control said inlet and outlet, means to limit the movement of each valve with respect to said float and toward the port respectively controlled thereby, and spring means to tend to hold said valves at the limit of their outward movement with respect to each other so that they may simultaneously close the respective ports controlled thereby during a predetermined position of said float.

19. The combination in a filling machine reservoir for liquid and counter-pressure fluid, of a float, an inlet tube for counter-pressure fluid extending upwardly into the reservoir, said float being slidable upon said tube, an outlet for counter-pressure fluid vertically aligned with said tube and spaced from the upper end of the latter, a pair of oppositely facing valves carried by said float and respectively adapted to control flow through said inlet and said outlet, means to limit the movement of each valve with respect to said float and toward the port controlled thereby, and spring means to tend to hold said valves at the limit of their movement away from each other to permit said valves to simultaneously close the respective ports controlled thereby during an intermediate position of said float.

20. The combination in a filling machine reservoir for liquid and counter-pressure fluid, of a float, an inlet for counter-pressure fluid, an outlet for counter-pressure fluid, a pair of oppositely facing valves carried by said float and respectively adapted to control said inlet and outlet, said valves being movable with respect to each other, means to limit the movement of the two valves away from each other, the total range of movement of said valves away from each other being greater than the distance between said inlet and outlet so that said valves may simultaneously close both said inlet and outlet at an intermediate position of said float.

21. The combination in a filling machine reservoir for liquid and counter-pressure fluid, of a float, an inlet tube for counter-pressure fluid extending upwardly into the reservoir, said float being slidable upon said tube, an outlet for counter-pressure air vertically aligned with said tube and spaced from the upper end of the latter, and a pair of oppositely facing valves adapted to respectively control said inlet and said outlet, said valves being movable with respect to each other, means to limit the movement of the two valves away from each other, the range of movement of said valves away from each other being greater than the distance between said inlet and said outlet so that said valves may simultaneously close both said inlet and outlet at an intermediate position of said float.

22. The combination in a filling machine reservoir for liquid and counter-pressure fluid, of a float, an inlet for counter-pressure fluid, an outlet for counter-pressure fluid, a pair of oppositely facing and relatively movable valves carried by said float and respectively adapted to control said inlet and outlet, the total range of movement of the two valves with respect to each other being greater than the distance between said inlet and outlet so that said valves may close either said inlet or outlet or both in accordance with the position of said float.

23. The combination in a filling machine including a reservoir for liquid having foaming characteristics and a counter-pressure fluid, of means to isolate the liquid from the counter-pressure fluid comprising a float of substantially the same area as the cross-sectional area of the reservoir, but having free vertical movement with respect to the reservoir wall, said float being provided with side walls of substantial depth to provide a relatively long area thereon on which foam rising from the liquid may accumulate in contact with the reservoir wall to seal the lower portion of the reservoir from the upper portion.

24. The combination in a filling machine including a filling head, of a reservoir for a liquid having foaming characteristics and a counter-pressure gas, a chamber within the reservoir provided with an outlet for the gas flowing to the filling head, the chamber being provided with an aperture through which it communicates with the body of the reservoir, the aperture being of small cross-section to prevent foam from entering the chamber and counter-pressure outlet.

25. The combination in a filling machine including a filling head, of a reservoir for a liquid having foaming characteristics and a counter-pressure gas, a chamber within the reservoir provided with an outlet for the gas flowing to the filling head, the chamber being provided with an aperture through which it communicates with the body of the reservoir, the aperture being sufficiently narrow to prevent foam from entering the chamber and counter-pressure outlet.

26. The combination in a filling machine including a filling head, of a reservoir for a liquid having foaming characteristics and a counter-pressure gas, a chamber within the reservoir provided with an outlet for the gas flowing to the filling head, the chamber being provided with an aperture through which it communicates with the body of the reservoir, the aperture being narrow and adjacent the side wall of the reservoir to prevent foam from entering the chamber and counter-pressure outlet.

27. The combination in a filling machine including filling heads and counter-pressure gas supply pipes therefor, of a reservoir for a liquid having foaming characteristics and a counter-pressure gas, a chamber within the reservoir, the filling head gas supply pipes communicating with the chamber, and the chamber communicating with the body of the reservoir through a relatively small aperture to substantially confine to said chamber the flow of gas between one filling head gas supply pipe and another.

28. The combination in a filling machine including filling heads and counter-pressure gas supply pipes therefor, of a reservoir for a liquid having foaming characteristics and a counter-pressure gas, a chamber within the reservoir, the filling head gas supply pipes communicating with the chamber, and the chamber communicating with the reservoir through a relatively small aperture to prevent flow of foam from the reservoir to the chamber and the gas supply pipes.

ROBERT J. STEWART.
WILTIE I. GLADFELTER.